Aug. 17, 1937.  T. RUBENS  2,090,553
WEEDER
Filed Jan. 28, 1937  2 Sheets-Sheet 1

Inventor
T. Rubens
By L. F. Randolph
Attorney

Aug. 17, 1937.  T. RUBENS  2,090,553
WEEDER
Filed Jan. 28, 1937   2 Sheets-Sheet 2

Inventor
T. Rubens
By L. F. Randolph
Attorney

Patented Aug. 17, 1937

2,090,553

UNITED STATES PATENT OFFICE 2,090,553

WEEDER

Timothy Rubens, Farmington, Wash.

Application January 28, 1937, Serial No. 122,845

4 Claims. (Cl. 97—144.1)

This invention relates to a wheeled agricultural implement and more specifically to a weeder.

It is particularly aimed to provide a machine of the character mentioned adapted to cut weeds such as morning-glory and Canada thistle below the surface of the ground and for instance from four to eighteen inches under the surface to the end that the remainder of the plant will be without light and air, discouraging sprouts, which are cut at a subsequent weeding operation and gradually die.

It is further aimed to provide a construction wherein the weeder blade is adjustable so as to give more or less suction as needed.

The more specific objects and advantages will become apparent from a consideration of the description following taken in connection with accompanying drawings illustrating an operative embodiment.

In said drawings:—

Figure 1:
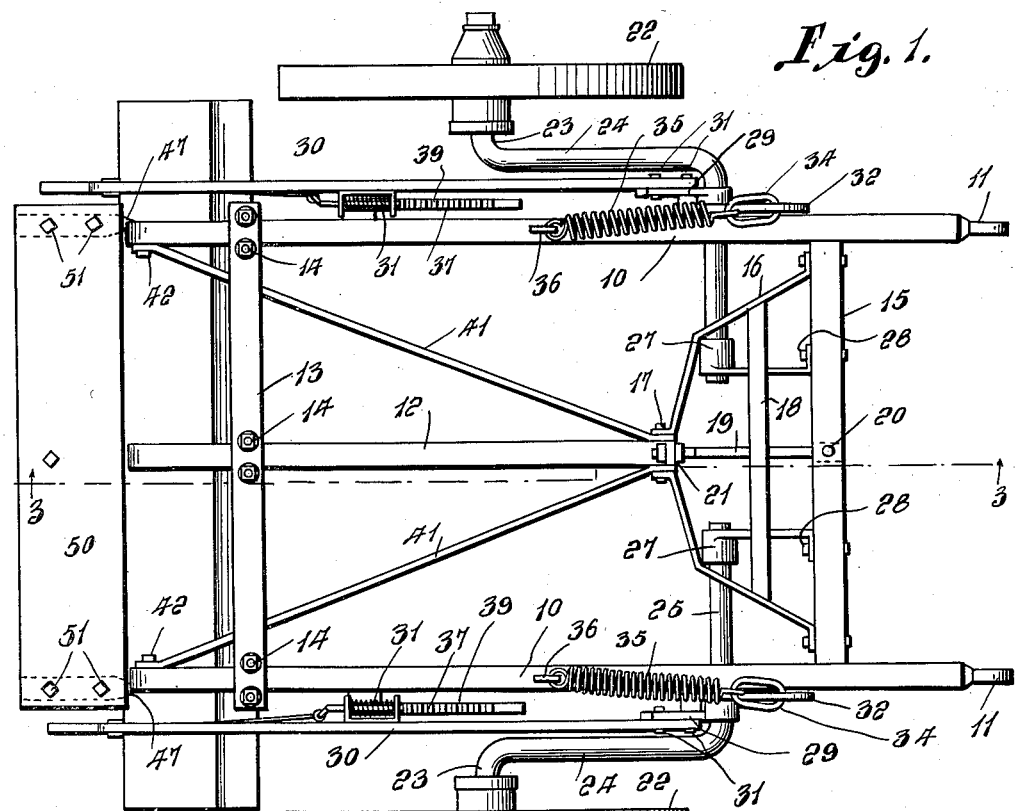
Figure 1 is a plan view of the weeder.
Figure 4:
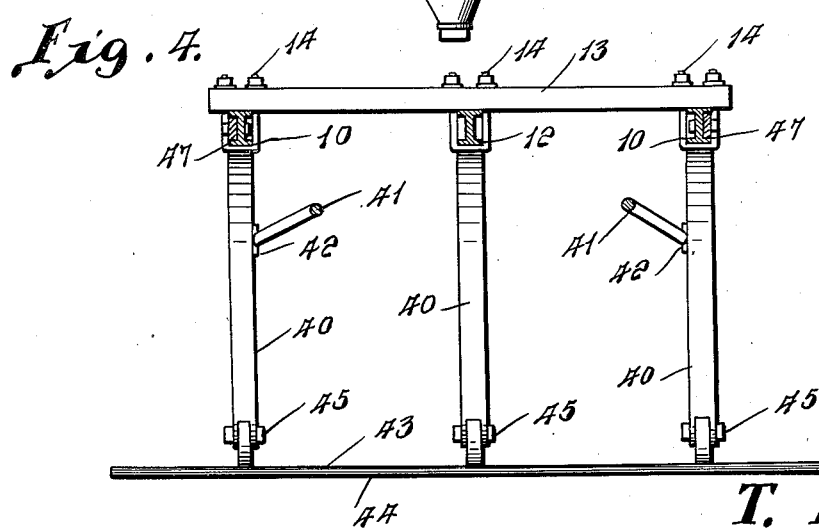
Figure 4 is a detailed section taken on the line 4—4 of Figure 2.
Figure 2:
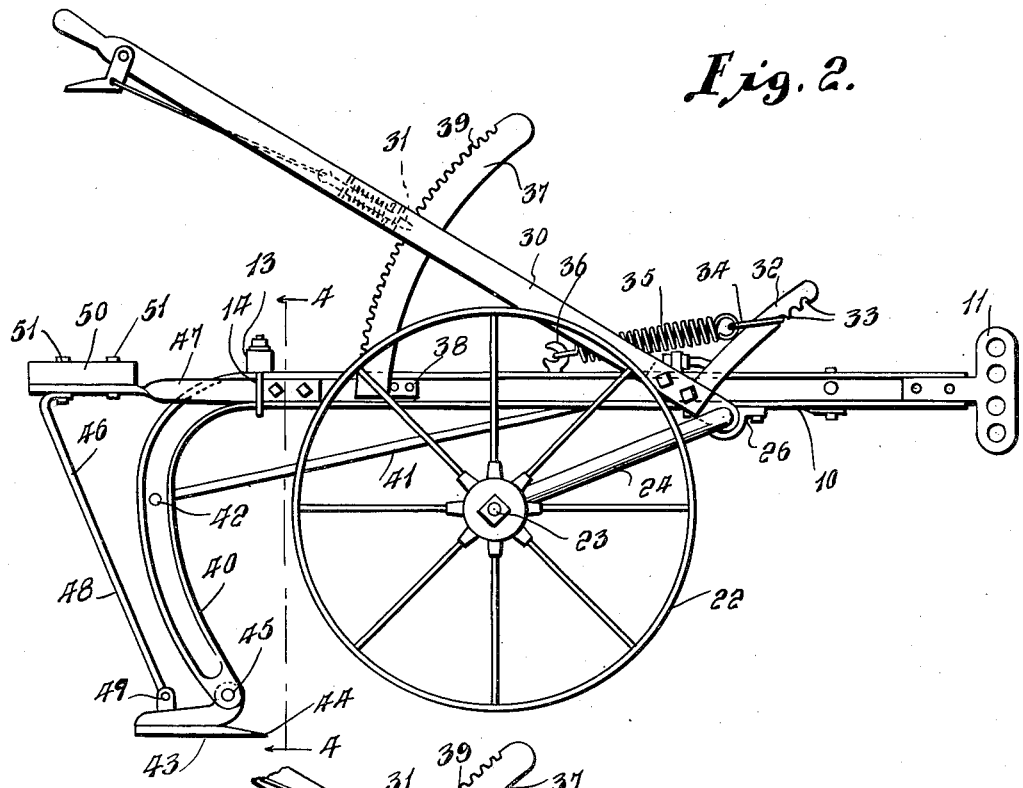
Figure 2 is a side elevation thereof.
Figure 3:
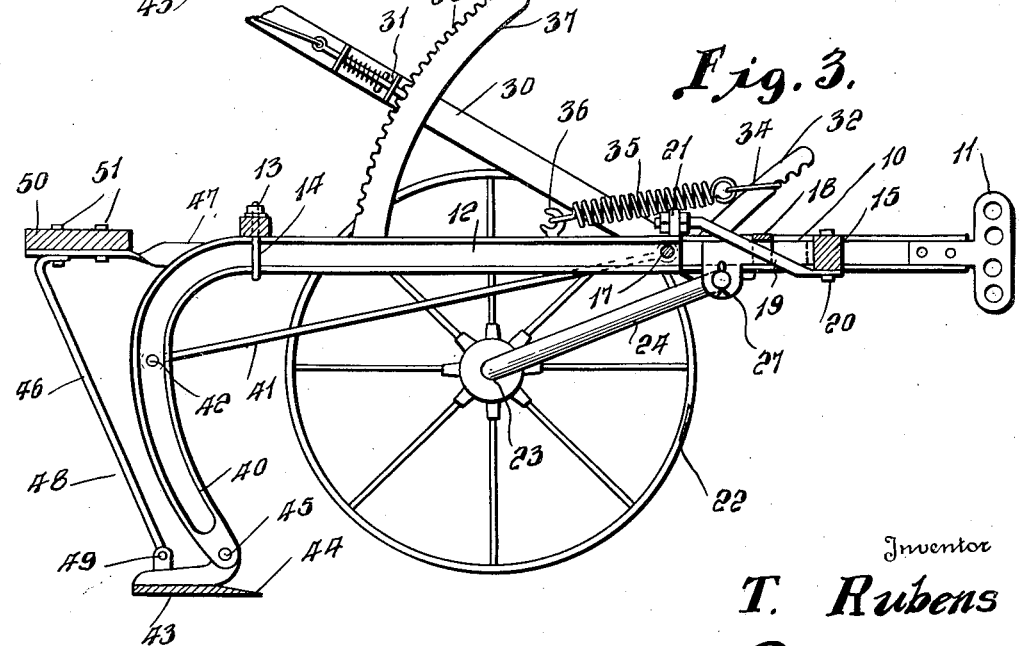
Figure 3 is a longitudinal sectional view taken on the line 3—3 of Figure 1.

Referring specifically to the drawings wherein like reference characters designate like or similar parts, a suitable frame is provided consisting of parallel side beams 10 each having a clevis or the equivalent 11 at its forward end whereby connection may be made with a tractor or a draft animal. Between and parallel with the side beams 10 is an intermediate beam 12. A rear cross beam 13 is rigidly connected to the beams first mentioned by U-bolts 14 and a front cross beam 15 rigidly connects the side beams 10 and has rearwardly and inwardly extending brackets 16 connected thereto and connected by means of a bolt or bolts 17, to the intermediate beam 12 adjacent its forward end. A brace 18, parallel to the beam 15, is connected to the brackets 16 and a substantially diagonal brace 19 is connected as at 20 to the lower surface of the cross beam 15 and as at 21 to the top of the intermediate beam 12.

A pair of ground wheels are provided at 22, suitably journaled on axle portions 23 of hangers 24 having cranks 25 journaled in bearings 26 secured to the undersurface of the beams 10 and also journaled in bearings 27 bolted as at 28 to and extending rearwardly from the cross beam 15.

Rigidly connected to the cranks 25 are arms 29 to which levers 30 are riveted or bolted as at 30ª. Extending from said arms 29 are projections 32 which have notches 33 in any of which a loop or link 34 connected to contractile springs 35 may be detachably fastened and which springs are also detachably fastened to hooks 36 attached to the side beams 10.

Arcuate rack bars 37 are fastened at 38 to the side beams 10 and extend upwardly therefrom and the levers 30 have conventional, hand operated, spring pressed latches 31 engageable in any of the notches 39 of the rack bars 37, to secure the cranks and accordingly the wheels in different positions. It is clear that the tension of the springs 35 is varied accordingly to the particular notch 33 engaged by the links 34.

At the rear ends, the side beams 10 have downwardly deflected portions 40. Brace rods 41 are connected at 42 to the portions 40 and at their forward ends, they are anchored by means of the bolt 17.

A weed cutter of plate-like form is provided at 43 sharpened at its forward edge 44 and the same is adapted to travel in the ground usually parallel with the surface thereof at the desired depth to cut the weeds and usually from four to fourteen inches. Bolts 45 detachably connect the weeder or cutter 43 to the lower ends of the beam portions 40 and such cutter 43 is supported in addition by means of angular brackets 46 having horizontal portions 47 fastened rigidly to the side beams 10. The depending portions 48 of said brackets 46 are connected by means of bolts 49 to said cutter blade or weeder 43. A plank or seat member 50 is supported on the horizontal portions 47, being fastened in place as by means of bolts 51.

As a result of the construction described, it will be realized that the operation of the levers 30, when unlatched at 31, will move the frame carrying the cutter 43, relatively to the wheels 22 in order to dispose the weeder blade 43 at the desired depth for cutting or weeding below the surface of the soil, the parts being held in the adjusted positions through the contractile action of the springs 35 and the engagement of the latches 31 with the rack bars 37.

Various changes may be resorted to provided they fall within the spirit and scope of the invention.

I claim as my invention:—

1. A weeder of the class described having a frame provided with side beams, wheels supporting the frame, said side beams having downwardly deflected portions, a weeder blade connected to said portions adjacent their lower ends, brackets connected to the side beams extending rearwardly and downwardly, said brackets adjacent their lower ends being connected to said blade, and a seat member supported on said brackets rearwardly of the side beams.

2. A weeder of the class described having a frame provided with side beams, a front cross beam between the side beams, a weeder blade carried at the rear of the side beams, an intermediate beam, brackets extending from the cross beam to a point adjacent the front of the intermediate beam, braces extending from said point to the rear portions of the side beams, fastening means securing the brackets, braces and intermediate beam together, bearings extending rearwardly from the cross beam, bearings on the side beams, ground wheels, hangers on which the ground wheels are journaled, said hangers having cranks journaled in said bearings and means adjustably mounting and securing said cranks to the frame.

3. A weeder of the class described having a frame provided with side beams, a front cross beam between the side beams, a weeder blade carried at the rear of the side beams, an intermediate beam, brackets extending from the cross beam to a point adjacent the front of the intermediate beam, braces extending from said point to the rear portions of the side beams, fastening means securing the brackets, braces and intermediate beam together, bearings extending rearwardly from the cross beam, bearings on the side beams, ground wheels, hangers on which the ground wheels are journaled, said hangers having cranks journaled in said bearings and means adjustably mounting and securing said cranks to the frame, comprising arms extending from the cranks, levers attached to the arms, contractile spring means fastened to the intermediate beam and the arms, and a rack and latch connection between the frame and said levers.

4. A weeder of the class described having a frame provided with said beams, a front cross beam between the side beams, a weeder blade carried at the rear of the side beams, an intermediate beam, brackets extending from the cross beam to a point adjacent the front of the intermediate beam, braces extending from said point to the rear portions of the side beams, fastening means securing the brackets, braces and intermediate beam together, bearings extending rearwardly from the cross beam, bearings on the side beams, ground wheels, hangers on which the ground wheels are journaled, said hangers having cranks journaled in said bearings, means adjustably mounting and securing said cranks to the frame, comprising arms extending from the cranks, levers attached to the arms, contractile spring means fastened to the intermediate beam and the arms, a rack and latch connection between the frame and said levers, said side beams extending downwardly at their rear portions, brackets having horizontal portions connected to the side beams and extending rearwardly therefrom and depending portions attached to the weeder blade, and a seat member supported on said horizontal portions.

TIMOTHY RUBENS.